United States Patent
Dain et al.

(10) Patent No.: US 11,409,900 B2
(45) Date of Patent: *Aug. 9, 2022

(54) PROCESSING EVENT MESSAGES FOR DATA OBJECTS IN A MESSAGE QUEUE TO DETERMINE DATA TO REDACT

(71) Applicant: INTERNATIONAL BUSINESS MACHINES CORPORATION, Armonk, NY (US)

(72) Inventors: Joseph W. Dain, Vail, AZ (US); Nilesh P. Bhosale, Pune (IN); Gregory T. Kishi, Oro Valley, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 162 days.

This patent is subject to a terminal disclaimer.

(21) Appl. No.: 16/192,795

(22) Filed: Nov. 15, 2018

(65) Prior Publication Data
US 2020/0159952 A1  May 21, 2020

(51) Int. Cl.
*G06F 21/62* (2013.01)

(52) U.S. Cl.
CPC ...... *G06F 21/6245* (2013.01); *G06F 21/6227* (2013.01)

(58) Field of Classification Search
CPC .................. G06F 21/6245; G06F 21/6227
USPC ......................................................... 707/769
See application file for complete search history.

(56) References Cited

U.S. PATENT DOCUMENTS

| 6,092,059 | A | 7/2000 | Straforini et al. |
| 8,407,805 | B2 * | 3/2013 | Warrington ......... G06F 21/6218 726/27 |
| 8,522,050 | B1 | 8/2013 | Wakerley |
| 8,590,050 | B2 | 11/2013 | Nagpal et al. |
| 8,595,595 | B1 | 11/2013 | Greanac et al. |
| 8,751,424 | B1 | 6/2014 | Wojcik et al. |
| 8,805,779 | B2 | 8/2014 | Ficara et al. |
| 9,026,497 | B2 | 5/2015 | Gokhale et al. |
| 9,135,266 | B1 | 9/2015 | Makin |

(Continued)

OTHER PUBLICATIONS

Notice of Allowance, dated Dec. 8, 2020, for U.S. Appl. No. 16/174,276 (22.159), invented by Gregory T. Kishi, Total 20 pages.

(Continued)

*Primary Examiner* — Hosain T Alam
*Assistant Examiner* — Saba Ahmed
(74) *Attorney, Agent, or Firm* — Konrad Raynes Davda & Victor LLP; David W. Victor

(57) ABSTRACT

Provided are a computer program product, method, and system for determining data to redact in an object. Event messages for objects are received. Each event message includes at least one facet, each facet for an instance of data in an object resulting from deep data inspection of the object that is used to determine whether the instance of data should be redacted. The event messages are added to a message queue. A determination is made of an event message in the message queue for an object having a facet for an instance of data that indicates the instance of data is to be redacted. Redaction is performed on the instance of data in the object in the determined event message having the facet indicating the instance of data is to be redacted data.

23 Claims, 7 Drawing Sheets

(56) References Cited

U.S. PATENT DOCUMENTS

| | | | |
|---|---|---|---|
| 9,632,878 B1 | 4/2017 | Maccanti et al. | |
| 9,734,169 B2 | 8/2017 | Redlich et al. | |
| 9,805,192 B1 | 10/2017 | Gates et al. | |
| 9,846,784 B1 | 12/2017 | Murray et al. | |
| 10,089,287 B2* | 10/2018 | Rebstock | G06F 16/93 |
| 10,200,470 B1 | 2/2019 | Chakraborty et al. | |
| 10,324,804 B1 | 6/2019 | Patwardhan et al. | |
| 10,983,985 B2 | 4/2021 | Kishi et al. | |
| 11,023,155 B2 | 6/2021 | Kishi et al. | |
| 11,042,532 B2 | 6/2021 | Dain et al. | |
| 2007/0124659 A1 | 5/2007 | Moore et al. | |
| 2008/0256183 A1 | 10/2008 | Flynn et al. | |
| 2010/0274750 A1 | 10/2010 | Oltean et al. | |
| 2011/0107042 A1 | 5/2011 | Herron | |
| 2011/0173404 A1* | 7/2011 | Eastman | G06F 11/1451 711/162 |
| 2015/0074052 A1 | 3/2015 | Srinivasan et al. | |
| 2015/0142752 A1 | 5/2015 | Chennamsetty et al. | |
| 2015/0324609 A1 | 11/2015 | Grubel et al. | |
| 2017/0091047 A1 | 3/2017 | Bangalore et al. | |
| 2017/0104756 A1 | 4/2017 | Rosenthal et al. | |
| 2017/0132186 A1* | 5/2017 | Plummer | G06F 40/166 |
| 2017/0262520 A1 | 9/2017 | Mitkar et al. | |
| 2018/0268166 A1 | 9/2018 | Alberton et al. | |
| 2019/0044809 A1 | 2/2019 | Willis et al. | |
| 2019/0356717 A1 | 11/2019 | Chen et al. | |

OTHER PUBLICATIONS

Response to Office Action, dated Aug. 31, 2020, for U.S. Appl. No. 16/120,179 (18.806), invented by Joseph W. Dain, Total 15 pages.

Response to Office Action, dated Aug. 30, 2020, for U.S. Appl. No. 16/174,272 (22.156), invented by Gregory T. Kishi, Total 11 pages.

Response to Office Action, dated Aug. 30, 2020, for U.S. Appl. No. 16/174,276 (22.159), invented by Gregory T. Kishi, Total 11 pages.

Response to Final Office Action, dated Feb. 3, 2021, for U.S. Appl. No. 16/120,179 (18.806) filed Aug. 31, 2018, Total 16 pages.

Response to Office Action, dated Feb. 1, 2021, for U.S. Appl. No. 16/192,793 (22.157), invented by Joseph W. Dain, Total 11 pgs.

Office Action, dated Jan. 3, 2020, for U.S. Appl. No. 16/192,793 (22.157), invented by Joseph W. Dain, Total 55 pages.

Response to Final Office Action 1 for U.S. Appl. No. 16/192,793, dated Aug. 30, 2021,13 pp. [22.157 (RFOA1)].

Response to Office Action 3 for U.S. Appl. No. 16/192,793, dated Dec. 15, 2021, 15 pp. [22.157 (ROA3)].

Office Action, dated Jun. 10, 2020, for U.S. Appl. No. 16/120,179 (18.806), invented by Joseph W. Dain, Total 29 pages.

Office Action, dated Jun. 2, 2020, for U.S. Appl. No. 16/174,272 (22.156), invented by Gregory T. Kishi, Total 31 pages.

Notice of Allowance, dated Dec. 17, 2020, for U.S. Appl. No. 16/174,272 (22.156), invented by Gregory T. Kishi, Total 30 pages.

Office Action3, dated Oct. 5, 2021, for U.S. Appl. No. 16/192,793 (22.157), invented by Joseph W. Dain, Total 44 pgs.

Office Action, dated Jun. 1, 2020, for U.S. Appl. No. 16/174,276 (22.159), invented by Gregory T. Kishi, Total 31 pages.

Final Office Action, dated Jun. 30, 2021, for U.S. Appl. No. 16/192,793 (22.157), invented by Joseph W. Dain, Total 55 pgs.

Final Office Action, dated Dec. 3, 2020, for U.S. Appl. No. 16/120,179 (18.806) filed Aug. 31, 2018, Total 30 pages.

Anonymous, "Automated Aggregate Threshold Data Preservation" dated Jan. 11, 2011, An IP.com Prior Art Database Technical Disclosure, IP.com No. IPCOM000202949D, Total 4 pages.

"IBM Cloud Object Storage System Definitive Guide to Dispersed Storage", IBM Corporation, [online] [retrieved Sep. 27, 2018] https://www.ibm.com/support/knowledgecenter/STXNRM_3.13.4/coss.doc/pdfs/coss_dispersed_book.pdf, pp. 40.

"Erasure code", Wikipedia, [online][retrieved Sep. 27, 2018], https://en.wikipedia.org/wiki/Erasure_code, pp. 5.

"Guide to Data Protection Best Practices" dated 2016, Tanberg Data, Total 12 pages.

IBM, "Backup Policy Management Across Heterogeneous Environments" dated Feb. 8, 2007, An IP.com Prior Art Database Technical Disclosure, IP.com No. IPCOM000146230D, Total 3 pages.

IBM, "Managing LOCAL Backups in the Context of Policy in Shared Storage Environments", dated Apr. 21, 2006, An IP.com Prior Art Database Technical Disclosure, IP.com No. IPCOM000135698D, Total 3 pages.

O. Khan, et al., "Rethinking Erasure Codes for Cloud File Systems Minimizing I/O for Recovery and Degraded Reads", pp. 14.

Orlando, K. et al., "IBM ProtecTIER Implementation and Best Practices Guide", dated Jun. 2016, Fourth Edition, International Technical Support Organization, Doc. No. SG24-8025-03, Total 512 pages.

List of Patents or Patent Applications Treated as Related, dated Nov. 27, 2018, pp. 2.

US Patent Application, dated Aug. 31, 2018, for U.S. Appl. No. 16/120,179 (18.806), invented by Joseph W. Dain, Total 33 pages.

US patent Application, dated Oct. 29, 2018, for U.S. Appl. No. 16/174,272 (22.156), invented by Gregory T. Kishi, Total 38 pages.

US patent Application, dated Nov. 15, 2018, for U.S. Appl. No. 16/192,793 (22.157), invented by Joseph W. Dain, Total 36 pages.

US patent Application, dated Oct. 29, 2018, for U.S. Appl. No. 16/174,276 (22.159), invented by Gregory T. Kishi, Total 38 pages.

Notice of Allowance dated May 27, 2022, pp. 58, for U.S. Appl. No. 16/192,793.

* cited by examiner

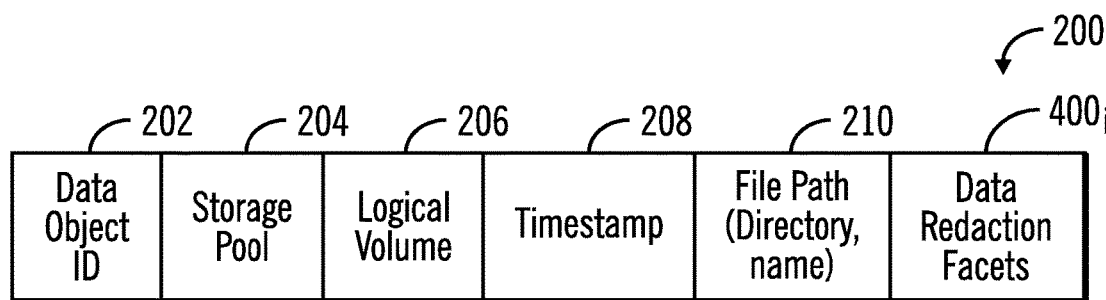
Event Message
FIG. 2
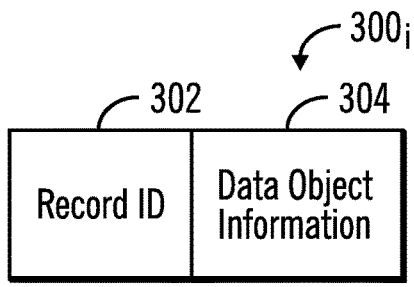
Database Record
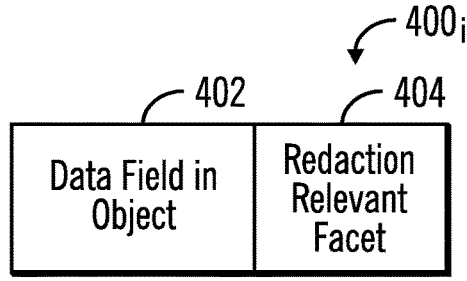
Data Redaction Facet
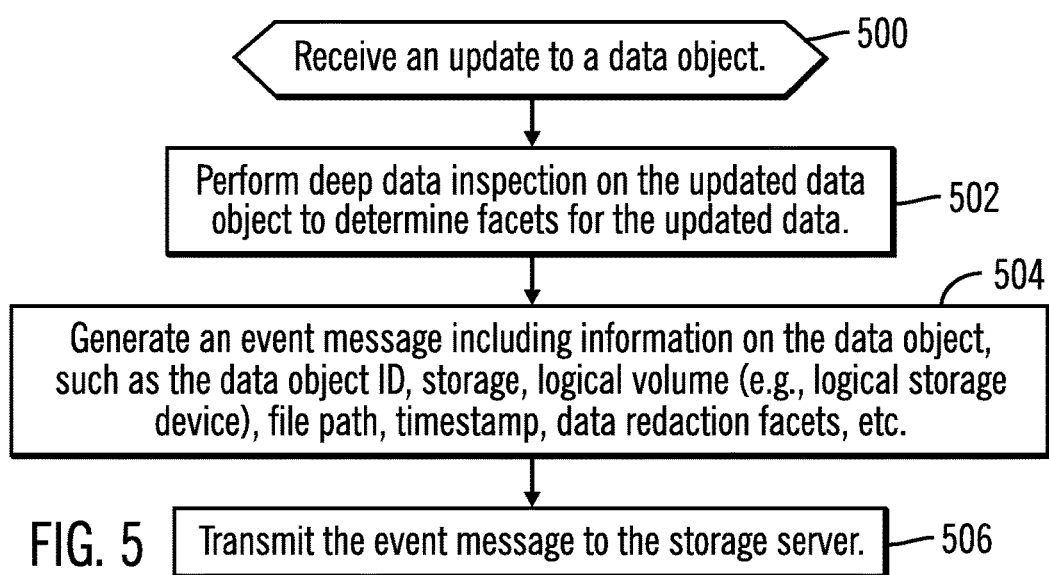
FIG. 5
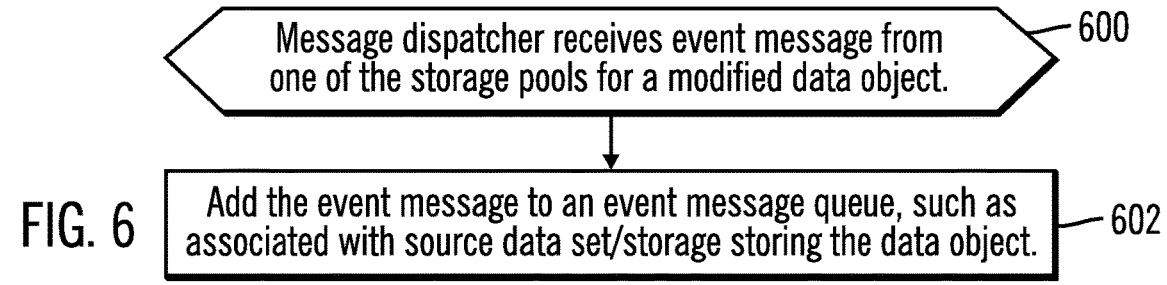
FIG. 6

Message Queue Subscriber Information

PROCESSING EVENT MESSAGES FOR DATA OBJECTS IN A MESSAGE QUEUE TO DETERMINE DATA TO REDACT

BACKGROUND OF THE INVENTION

1. Field of the Invention

The present invention relates to a computer program product, system, and method for processing event messages for data objects to determine data to redact from a message queue database.

2. Description of the Related Art

Data objects in a large-scale storage environment may be stored in distributed storage systems. As data is generated and modified at ever increasing rapid speeds and the amount of data exponentially increases, the computational efforts to process data for management purposes based on organizational policies likewise increases.

Many large-scale storage environments store sensitive data, such as personally identifiable information, financial information, health information, etc., that needs to be redacted. Organizations use tools that periodically scan source storage systems to determine data for fields that require redaction. If these fields are found, they are redacted in the data. Enterprise content managers/repositories intercept data in a data path to inspect the data as it is ingested and perform redaction.

There is a need in the art for improved techniques to redact data from documents in a storage environment.

SUMMARY

Provided are a computer program product, method, and system for determining data to redact in an object. Event messages for objects are received. Each event message includes at least one facet, each facet for an instance of data in an object resulting from deep data inspection of the object that is used to determine whether the instance of data should be redacted. The event messages are added to a message queue. A determination is made of an event message in the message queue for an object having a facet for an instance of data that indicates the instance of data is to be redacted. Redaction is performed on the instance of data in the object in the determined event message having the facet indicating the instance of data is to be redacted data.

With the above embodiment, event messages having facets on instances of data object are added to message queues for immediate processing in the queues. Objects having an instance of data that is to be redacted as indicated by the facet for the data object are determined from the message queue to provide immediate redaction on objects as they are received in the message queue. Because the objects in the message queue are immediately processed directly from the message queues, objects just updated are immediately processed to determine data to redact.

In a further embodiment, a facet that indicates data to redact comprises at least one of sensitive data, personally identifiable information, and financial information.

With the above embodiment, the facets are used to determine objects having certain types of sensitive data that needs to be redacted to remove personal and financial information.

In a further embodiment, redaction rules indicate data types to redact. A facet indicates the instance of data is to be redacted in response to the facet matching one of the data types indicated in the redaction rules. Data instances having facets matching one of the data types in the redaction rules is to be redacted.

With the above embodiments, the redaction determination is made based on redaction rules to redact data instances having facets matching a data in the redaction rules. This allows for control of what data is to be redacted by specifying data types in the redaction rules.

In a further embodiment, an update on a new data type to redact is received and a determination is made of an event message in the message queue for an object having a facet for an instance of data matching the new data type. Redaction is performed on the instance of data in the object having the facet matching the new data type.

With the above embodiment, new data types to redact may be received to allow immediate determination of data objects having an instance of the new data type that needs to be redacted. This allows for compliance with any regulations that indicate new data types that are sensitive and should be redacted by determining objects indicated in the message queue having an instance of the data matching the new data type to allow compliance with any new regulations.

In a further embodiment, redaction rules indicate data types to redact, wherein a data instance is redacted having a facet matching one of the data types indicated in the redaction rules. The new data type is added to the redaction rules to be available for the next redaction operation on the data object.

With the above embodiment, redaction rules used to determine data types in objects to redact are immediately updated to reflect new received data types to ensure compliance with any new regulations or best practices for new data types to redact.

In a further embodiment, an event message includes metadata on an updated object, wherein deep data inspection is performed on the updated object to update facets for the updated object that is added to the database.

With the above embodiment, when updating an object, a deep data inspection is performed of the updated data object to determine any updated facets that may reflect data instances to redact based on the recent changes to the object. This allows for immediate redaction of data if new data instances of a data type to redact are added to the updated object by having the deep data inspection process the updated data object to determine any new facets to include in the event message for consideration to redact.

In a further embodiment, event messages are generated immediately after a modification resulting in the updated object to provide information on real-time changes to updated objects to the message queue.

With the above embodiment, providing immediate event messages ensures that the database is updated in real time so objects are timely redacted immediately upon being added to the message queue to protect any sensitive data added to the data objects.

In a further embodiment, an update is received on a new data field to redact. A determination is made of a facet in an event message in the message queue for an object indicating data for the new data field. Data for the determined facet is redacted in the object for the new data field.

With the above embodiment, if an update is received on a new data field to redact, then a determination is made whether a facet in an event message in the message queue indicates an object has data for the new data field and, if so, redacting data for the determined facet.

With the above embodiment, when there is a new data field to redact, an immediate determination can be made whether data for the new data field needs to be redacted for an event message in the queue to allow immediate application of the update on a new data field to redact to make sure that new data field is redacted for updates to objects just received in the message queue.

In a further embodiment, notification is received of an event message added to the message queue and the message queue is read to read the event message in response to receiving the notification.

In a further embodiment, in response to adding an event message to the message queue, a determination is made of a consumer process subscribed to the message queue to which the event message was added. Notification is sent to the determined consumer process to cause the determined consumer process to read the event message added to the message queue.

With the above embodiment, a notification is sent to a consumer subscribed to a message queue that received an event message to cause that consumer to immediately read event messages to process to determine data to redact. This allows immediate application of redaction rules to objects for which event messages were just received and added to the event message queue.

BRIEF DESCRIPTION OF THE DRAWINGS

FIG. 2 illustrates an embodiment of an event message.

FIG. 3 illustrates an embodiment of database record.

FIG. 4 illustrates an embodiment of a data redaction facet.

FIG. 5 illustrates an embodiment of operations to generate an event message for an updated data object.

FIG. 6 illustrates an embodiment of operations to dispatch an event message to a message queue.

DETAILED DESCRIPTION

In large-scale storage environments having files distributed across numerous storage systems, organizations may have difficulty determining data that is required to be redacted, such as personally identifiable information, financial information, health information, etc. One technique to redact data is to scan source storage systems to search for fields in files that require redaction. This technique requires dedication of substantial computational resources to post-process scanning to identify data in files and objects to redact. As part of determining data to redact, a system will scan numerous files, such as billions of files, in the distributed storage and file systems, to determine data to redact, which may change as the file is modified. One problem with current scanning techniques is that as scale of the number of files in distributed file systems increases to several billion files and database records, the time and computational effort to scan objects across different storages substantially increases. Further, performing scanning as part of post-processing may cause delays in redacting sensitive and personal information, which may leave that data exposed to unauthorized access in the file system.

Described embodiments provide improvements to computer technology for redacting data by substantially reducing the time to determine data to redact in modified files by having the source or client systems generate in real-time event messages having information on changed data objects that are sent to a storage server to dispatch to message queues. The event messages are processed from the message queues to add to a database. The database may be queried for changed data objects having facets providing classifications and descriptions of data fields that match data types to redact in data redaction rules. This allows a determination of data to redact very quickly from the database, such as from a fast database index, by determining changed data objects having facets for data instances matching data types to redact.

In this way, a database is populated with information on changed data objects in real-time from messages generated from source systems in real-time, and this real-time database may be searched to immediately determine changed data objects having data to redact to allow for immediate redaction to immediately comply with redaction requirements, which may be promulgated by government and industry organizations.

In a further embodiment, the determination of changed data objects having data to redact may be immediately determined from the message queues by notifying a consumer process when an event message for a changed data object is added to a message queue. The notified consumer process reads an event message from the message queue for which the notification was sent and immediately determines in real-time whether this recently modified data object has data to redact.

Figure 1:
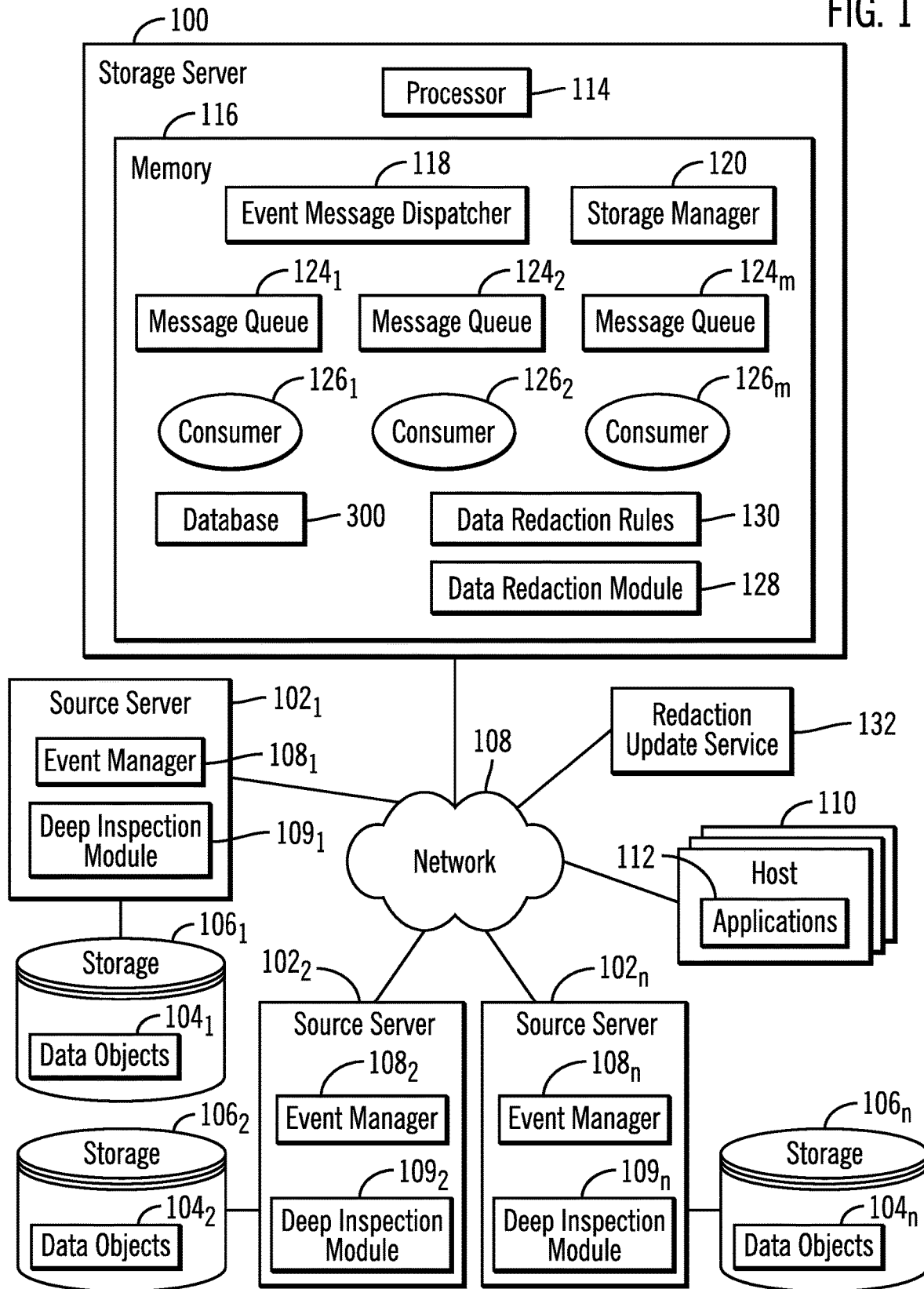
FIG. 1 illustrates an embodiment of a storage environment.

FIG. 1 illustrates an embodiment of a storage environment including a storage server 100 that receives event messages 200 (FIG. 2) from source servers $102_1$, $102_2$ ... $102_n$ that are generated when a source server $102_1$, $102_2$ ... $102_n$ applies an update to a data object $104_1$, $104_2$ ... $104_n$ to a storage $106_1$, $106_2$ ... $106_n$ managed by the source server $102_1$, where the update to a data object may comprise a delete, modification or adding of a data object. A data object or object $104_1$ may comprise a file, database object, logical blocks, volume, chunks, extents or any other storage unit in which data may be separately manipulated and addressed. Event managers $108_1$, $108_2$ ... $108_n$ at the source servers $102_1$, $102_2$ ... $102_n$ create and send the event messages 200 to the storage server 100 upon receiving a modification to a data object from an application 112 in a host system 110 in real-time before the modification is applied to the storage $106_i$. In this way, the storage server 100 receives event messages 200 on modifications to data objects immediately in real-time when the changes are made, and in certain embodiments before the changes are applied to the storage $106_i$.

The source servers $102_1$, $102_2$ ... $102_n$ include a deep inspection module $109_1$, $109_2$ ... $109_n$ that processes the data objects $104_1$, $104_2$ ... $104_n$ and determines facets for data fields or data instances in the objects that provides a description or classification of data instances, also referred to as data fields, that can be used to determine whether the data instance should be redacted. For instance, the facet may indicate that a data field or instance in the object comprises a type of personally identifiable information (e.g., social security number, name, address, phone number, etc.), financial information (bank and credit account numbers), sensitive information, medical information, such as diagnosis and prescriptions, etc. The facet may further indicate data types that do not need to be redacted, such as anything else that is not recognized as data that needs to be redacted in the redaction rules 130.

The deep inspection module $109_1$, $109_2$ . . . $109_n$ may utilize a natural language classification program that collects and analyzes content in the data objects $104i$ to provide a predefined classification based on processing of the content in data fields, or data instances. The deep inspection module $109_i$ may use deep inspection techniques such as IBM® Watson™ Explorer Content analytics, Sentiment Analytics, Contextual Views based on natural language classification as well as Watson™ Application Programming Interfaces (APIs) such as speech to text, visual recognition, etc. These techniques help in capturing metadata information from data objects and determining a classification of the data. (IBM and Watson are trademarks of International Business Machines Corporation throughout the world).

The storage server 100 includes a processor 114, such as one or more processor devices, and a memory 116 having program code executed by the processor 114, including an event message dispatcher 118 to process event messages 200 from event managers $108_1$, $108_2$ . . . $108_n$ and a storage manager 120 to determine an appropriate storage $106_i$ for modified data objects. The event message dispatcher 118 receives event messages 200 and adds the messages to one or more message queues $124_1$, $124_2$ . . . $124_m$ in the memory 116. For instance there may be a message queue $124_i$ for each storage $106_i$ and an event message 200 for an update to a data object at one of the storages $106_1$, $106_2$ . . . $106_n$ is added to the message queue $124_i$ for the storage $106_i$ having the updated data object. The memory 116 may further include one or more consumers $126_1$, $126_2$ . . . $126_m$ to process event messages in one or more of the message queues $124_1$, $124_2$ . . . $124_m$ to convert the information on an updated data object in an event message 200 to a database record $300_i$ (FIG. 3) to store in a database 300.

The storage server 100 includes a data redaction module 128 to redact data fields and instances from data objects $104_i$ using data redaction rules 130 indicating data types that should be redacted from objects, such as personally identifiable information, financial information, medical information, etc. The data redaction module 128 may perform redaction by making the data fields to redact unintelligible, such as by replacing the data to redact by a meaningless string, blacking out the data with a large blackout rectangle, and/or encrypting the data In one embodiment, the deep inspection module $109_i$ may be implemented in the source servers $102_1$, $102_2$ . . . $102_n$ as shown in FIG. 1, where the deep inspection module $109_i$ may process a data object $104_i$ to determine any new facets for updated data instances in the updated object $104_i$. The deep inspection module $109_i$ reads a data object $104_i$ from a storage $106_i$ to perform the data classification. In a further embodiment, the deep inspection module $109_i$ may be implemented at the storage server 100. In a still further embodiment, the deep inspection module $109_i$ may be implemented in a separate system or in a hardware device.

There may be any number of message queues $124_i$ and consumers $126_i$ to process the message queues $124_i$, where consumers $126_i$ may process requests from one or more of the message queues $124_i$. In certain embodiments, there may be a separate message queue $124_i$ for each source data set $104_i$.

The database 300 may comprise a No Structured Query Language (No SQL) database, an SQL database, a relational database, objected oriented database, Extended Markup Language (XML) database, and any other suitable database known in the art.

The storages $106_1$, $106_2$ . . . $106_1$, may be implemented in different types or classes of storage devices, such as magnetic hard disk drives, magnetic tape storage, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Storage arrays may further be configured ranks in the storage devices, such as Just a Bunch of Disks (JBOD), Direct Access Storage Device (DASD), Redundant Array of Independent Disks (RAID) array, virtualization device, etc. Further, the storage devices implementing the storages $106_1$, $106_2$ . . . $106_n$ may comprise heterogeneous storage devices from different vendors and different types of storage devices, such as a first type of storage devices, e.g., hard disk drives, that have a slower data transfer rate than a second type of storage devices, e.g., SSDs.

The memory 116 may comprise a suitable volatile or non-volatile memory devices, including those described above.

A redaction update service 132 provides updated redaction data types to redact to the storage server 100 to update the data redaction rules 400, such as new regulatory compliance requirements for redacting data. In one embodiment, the redaction update service 132 may comprise a cognitive news discovery services like the IBM Watson Discovery News service, which tracks latest news on various topics, including new regulatory compliance requirements.

FIG. 2 illustrates an embodiment of an instance of an event message 200 generated by an event manager $108_i$ to provide to the storage server 100 to use to determine whether to redact data in a data object $104_i$, and includes a data object ID 202 identifying a data object $104_i$; storage pool 204 in which the data object 202 is stored; a logical volume 206 in which the data object is stored, e.g., logical unit number (LUN), volume, logical drive, etc.; a timestamp 208 indicating a time the data object 202 was created and/or last modified; a file path 210, such as a directory name, including the data object 202; and a facet $400_i$ for each data instance in the object 202 providing a description or classification of the data instance in the object 202 that is used to determine whether to redact the data instance from the object 202.

FIG. 3 illustrates an embodiment of a database record $300_i$ in the database 300 and includes a record identifier (ID) 302 identifying the database record $300_i$ in the database 300 and data object information 304, which may comprise all or some of the information in the event message 200 in fields of the database record $300_i$. The database 300 may also include an index to allow fast searching of records $300_i$ based on relevant backup key/value pairs, such as the time the database object was last updated, data type, source data set, etc.

FIG. 4 illustrates an embodiment of a data redaction facet $400_i$ generated by a deep inspection module $109_i$ for a data filed in an object including a data field or data instance in the object 402 and a redaction relevant facet 404 that may be used to determine whether to perform redaction of the data in the data instance.

FIG. 5 illustrates an embodiment of operations performed by an event manager $108_i$ to generate an event message 200 for an update to a data object in a source data set $104_i$ managed by the event manager $108_i$. Upon receiving (at block 500) the update to a data object, the event manager $108_i$ calls (at block 502) the deep inspection module $109_i$ to perform deep inspection on the updated data object to determine facets for the updated data providing attributes and characterizations of instances of data in the updated object that can be used to determine whether the data instance should be redacted. The event manager $108_i$ generates (at block 504) an event message 200 including information on the data object, such as the data object ID 202, storage 204 storing the data object 202, logical volume 206, timestamp 208, file path 210, and determined data redaction facets $400_i$. The generated event message 200 is sent (at block 506) to the storage server 100 to dispatch to one of the message queues $124_1, 124_2 \ldots 124_m$.

With the embodiment of FIG. 5, the event manager $108_i$ may generate the event message 200 immediately upon receiving the update to the data object before the update is applied to the storage $106_i$. In this way, the event messages 200 provide real time information on updates to the data objects and updated facets for changes to data instances and fields in the data object to the storage server 100 so that the database 300 has current information on changed data objects and there facets.

FIG. 6 illustrates an embodiment of operations performed by the event message dispatcher 118 to process an event message 200 received from an event manager $108_i$ having information on an update to a data object in a source data set $104_i$. Upon receiving (at block 600) an event message 200, the event message dispatcher 118 adds (at block 602) the event message 200 to an event message queue $124_i$. The event message queue $124_i$ may be selected based on workload load balancing to evenly distribute messages 200 among the message queues or having storages assigned to message queues, so an event message is added to the message queue $124_i$ associated with the storage $106_i$ in which the data object $104_i$ of the event message is stored.

Figure 7:
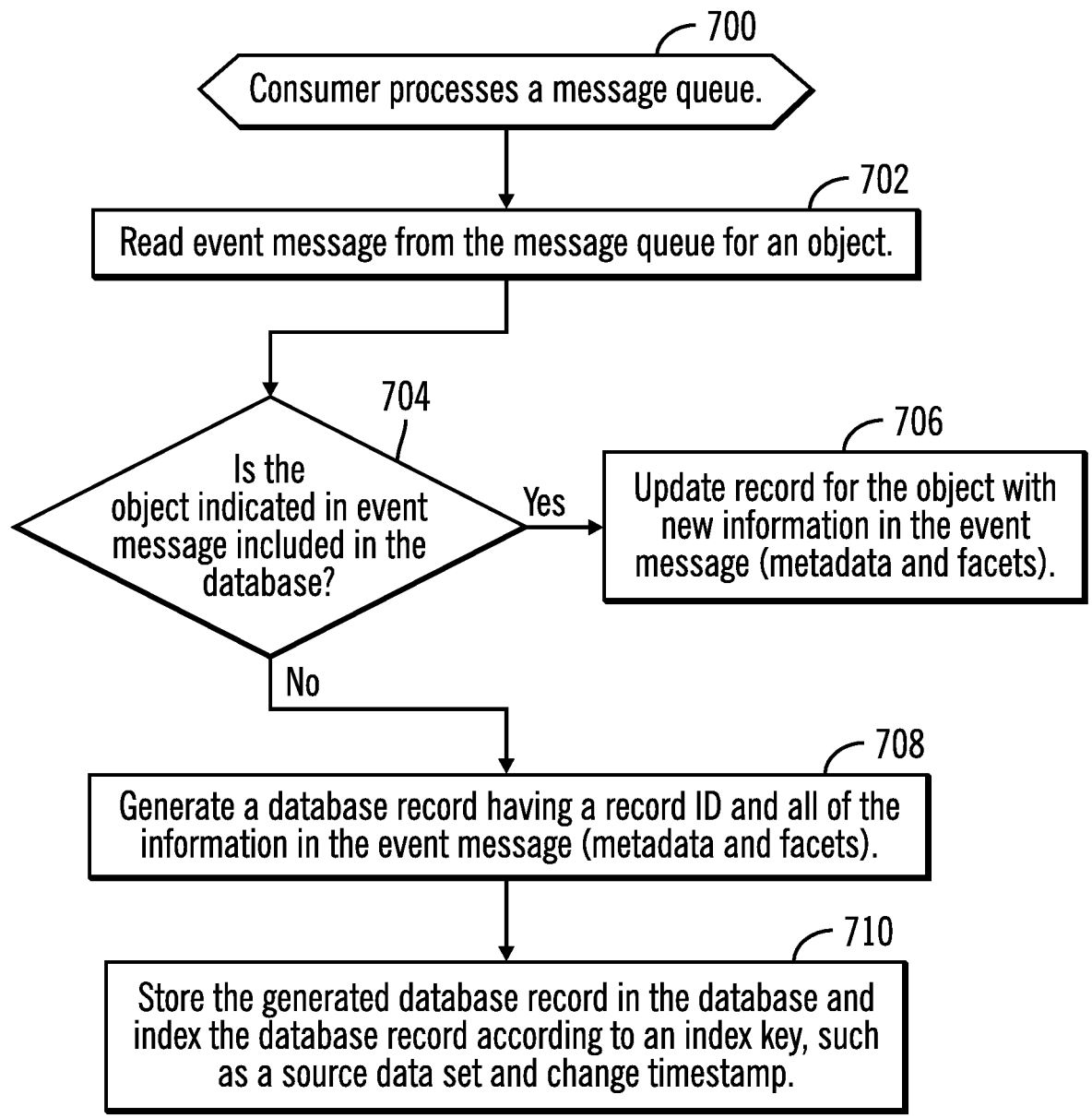
FIG. 7 illustrates an embodiment of operations to process a message queue.

FIG. 7 illustrates an embodiment of operations performed by a consumer $126_i$ process to process one or more event messages 200 in a message queue $124_i$. Upon a consumer $126_i$ processing (at block 700) a message queue $124_i$, the consumer $126_i$ reads (at block 702) an event message 200 from the message queue $124_i$. If (at block 704) the object indicated in the event message 200 is in the database 300, i.e., there is a record $300_i$ for the object in the database $300_i$, then the record $300_i$ for the object is updated (at block 706) with new information in the event message 200, such as updated metadata (e.g., 204, 206, 208, 210) and updated facets $400_i$ for data instances in the object. If (at block 704) there is no record $300_i$ for the object indicated in the event message in the database 300, then the consumer $126_i$ generates (at block 708) a database record $300_i$ having a record ID 302 and database object information 304 comprising the information 202, 204, 206, 208, 210, $400_i$ in the received event message 200. The generated database record $300_i$ is stored (at block 710) in the database 300 and a database index according to an index key, such as a source data set, change timestamp, etc.

With the embodiments of FIGS. 5, 6, and 7, information on real-time updates to data objects are generated and provided to the storage server 100 to store in the database 300. In this way, the database 300 immediately reflects the current state of updates to data objects and facets to use to determine data to redact. Further, the event message dispatcher 118 receives event messages 200 from different storages $106_1, 10_2 \ldots 106_n$ to allow the database 300 to reflect updates to data objects in different storages $106_1, 106_2 \ldots 106_n$.

Figure 8:
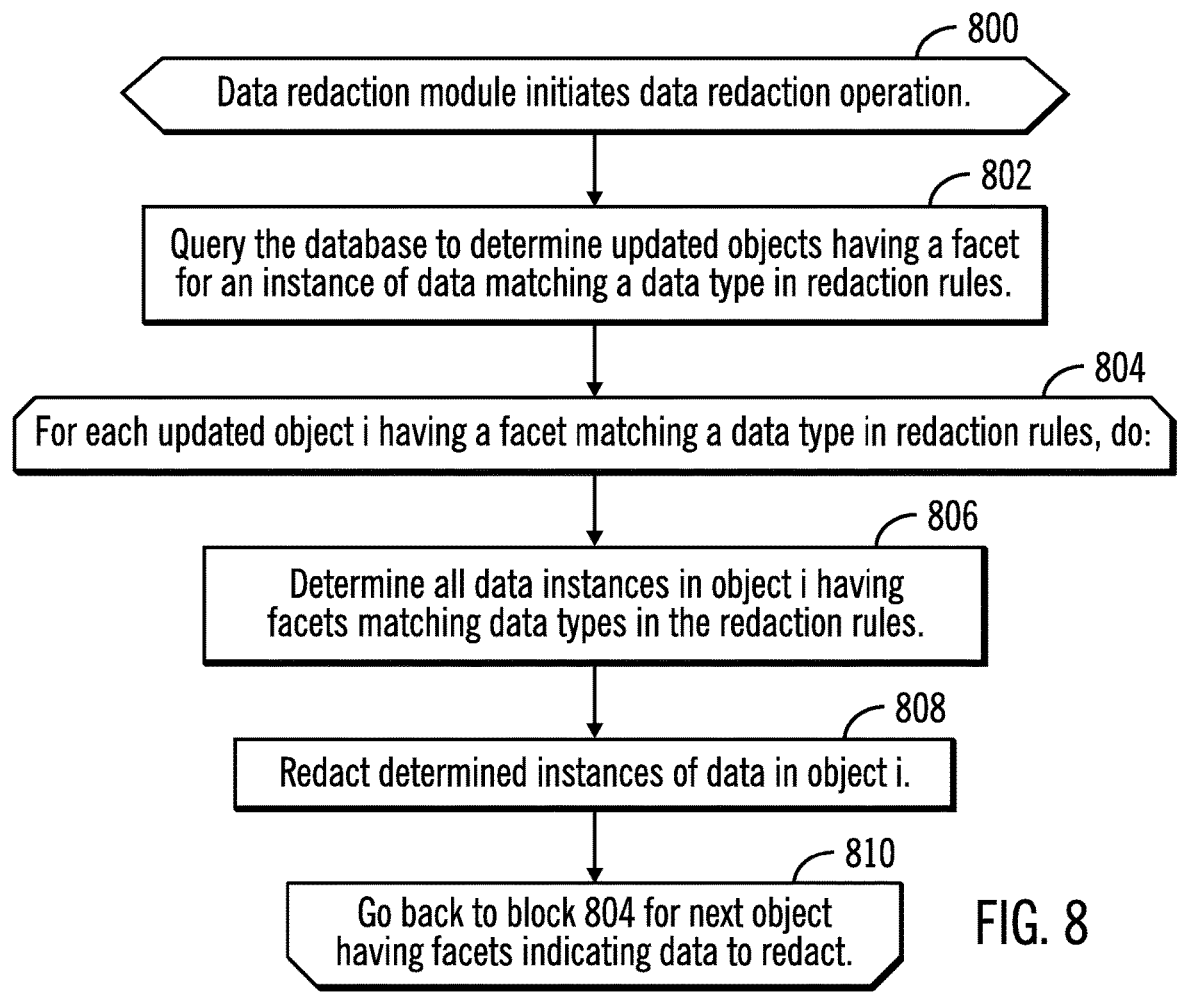
FIG. 8 illustrates an embodiment of operations to determine data to redact from data objects.

FIG. 8 illustrates an embodiment of operations performed by the data redaction module 128 to redact data from data objects indicated in received event messages 200 using the database 300. Upon initiating (at block 800) a data redaction operation, the data redaction module 128 queries (at block 802) the database 300 to determine updated objects, such as objects having a timestamp 208 greater than recent threshold time, that has at least one facet $400_i$ for an instance of data matching a data type in the redaction rules 130. A match may comprise an exact or fuzzy (approximate) match of the facet $400_i$ string and a string of a data type in the redaction rules 130 to redact. A match may also involve natural language processing and data mining to determine relatedness of terms within a degree of confidence. For each updated object $104_i$ having a facet $400_i$ matching a data type in redaction rules 130 indicating data to redact, a loop of operations is performed at block 804 through 810. At block 806, the data redaction module 128 determines all data instances in object $104_i$ having facets $400_i$ matching data types in the redaction rules 130 and then redacts (at block 808) the determined instances of data in the object $104_i$. The redacted object $104_i$ is then stored in the storage $106_i$.

With the embodiment of FIG. 8, the database 300 is immediately updated with updated facets for updated objects by processing the event messages 200 in the message queues $124_1, 124_2 \ldots 124_m$, where the event messages 200 are immediately generated at the source servers $102_1, 102_2 \ldots 102_n$ upon modifications to the data objects. This allows for real-time immediate processing of updated data objects to determine if data needs to be redacted to provide for immediate compliance with data redaction rules 130. Further, because the database 300 provides real-time information on updated data objects, the data objects subject to data redaction indicated in the database 300 comprise the most recent modified data objects.

Figure 9:
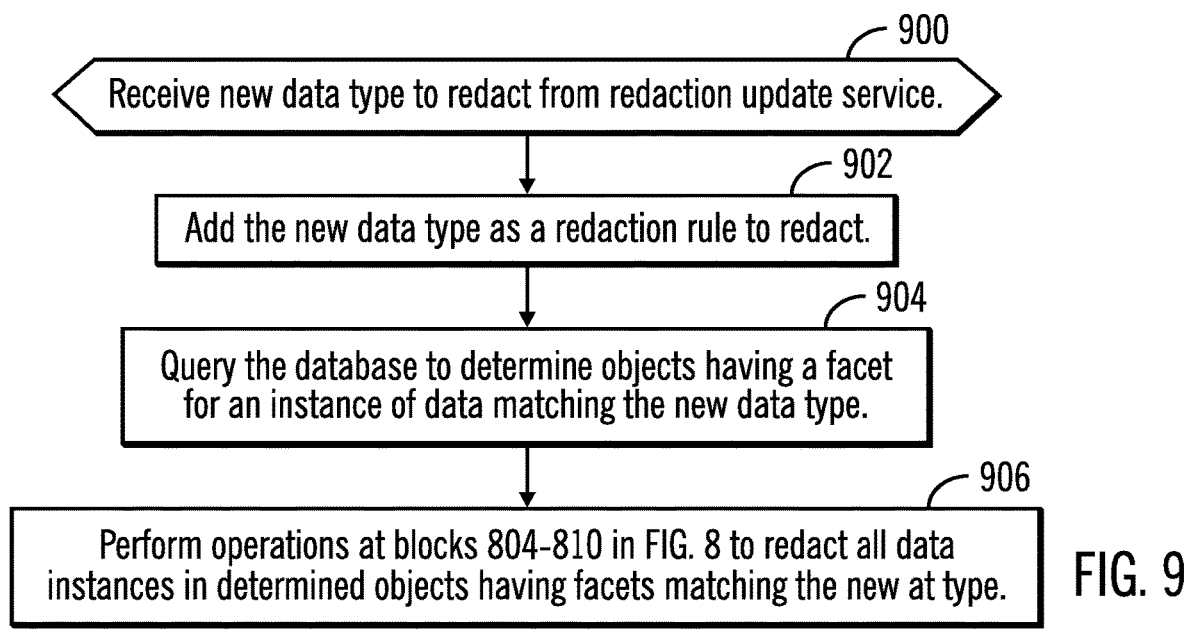
FIG. 9 illustrates an embodiment of operations to process a new data type to redact from a redaction update service.

FIG. 9 illustrates an embodiment of operations to process new data types to redact from a redaction update service 132, which may provide alerts on new government or industry regulations and guidelines for data to redact. Upon receiving (at block 900) a new data type to redact from the redaction update service 132, the data redaction module 128 or other component adds (at block 902) the new data type as a redaction rule in the data redaction rules 130 to redact. The data redaction module 128 further queries (at block 904) the database 300 to determine any object information $300_i$ having a facet $400_i$ for an instance of data in the object matching the new data type. The operations at blocks 804-810 are then performed (at block 906) to redact any data instances having a facet matching that of the new data type to provide immediate redaction of the data and compliance with the new redaction rule.

With the embodiment of FIG. 9, updates of new data types to redact are immediately added to the data redaction rules 130 to immediately apply to objects $104_i$ indicated in the database 300 to allow for immediate compliance to the new redaction data type, which may be required by a government or industry organization.

Figure 10:
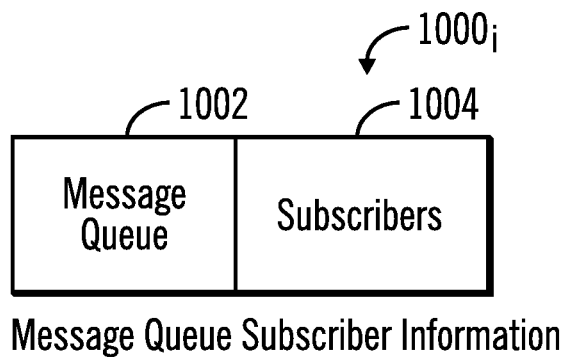
FIG. 10 illustrates an embodiment of message queue subscriber information.
Figure 11:
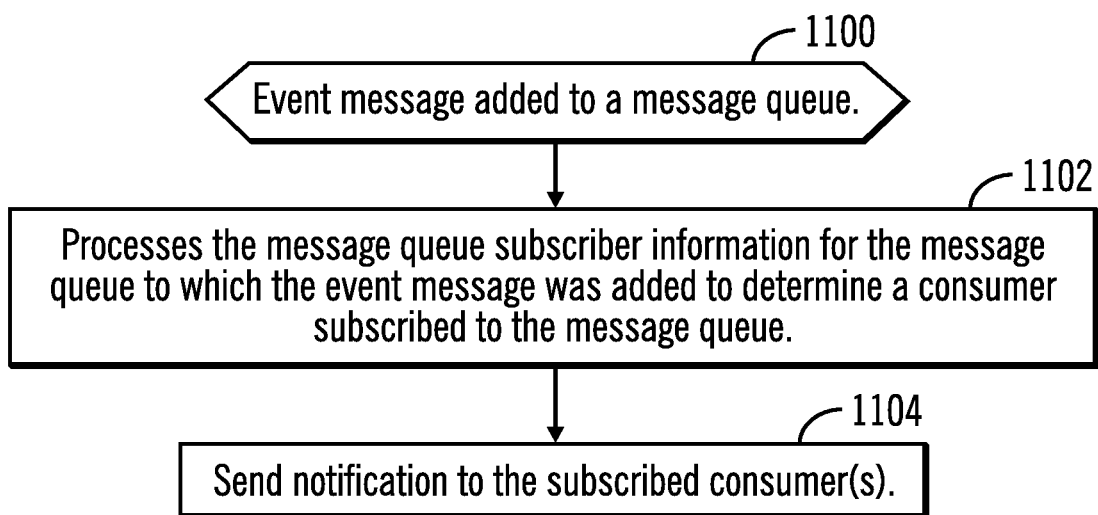
FIG. 11 illustrates an embodiment of operations to provide a notification for an event message added to a message queue.
Figure 12:
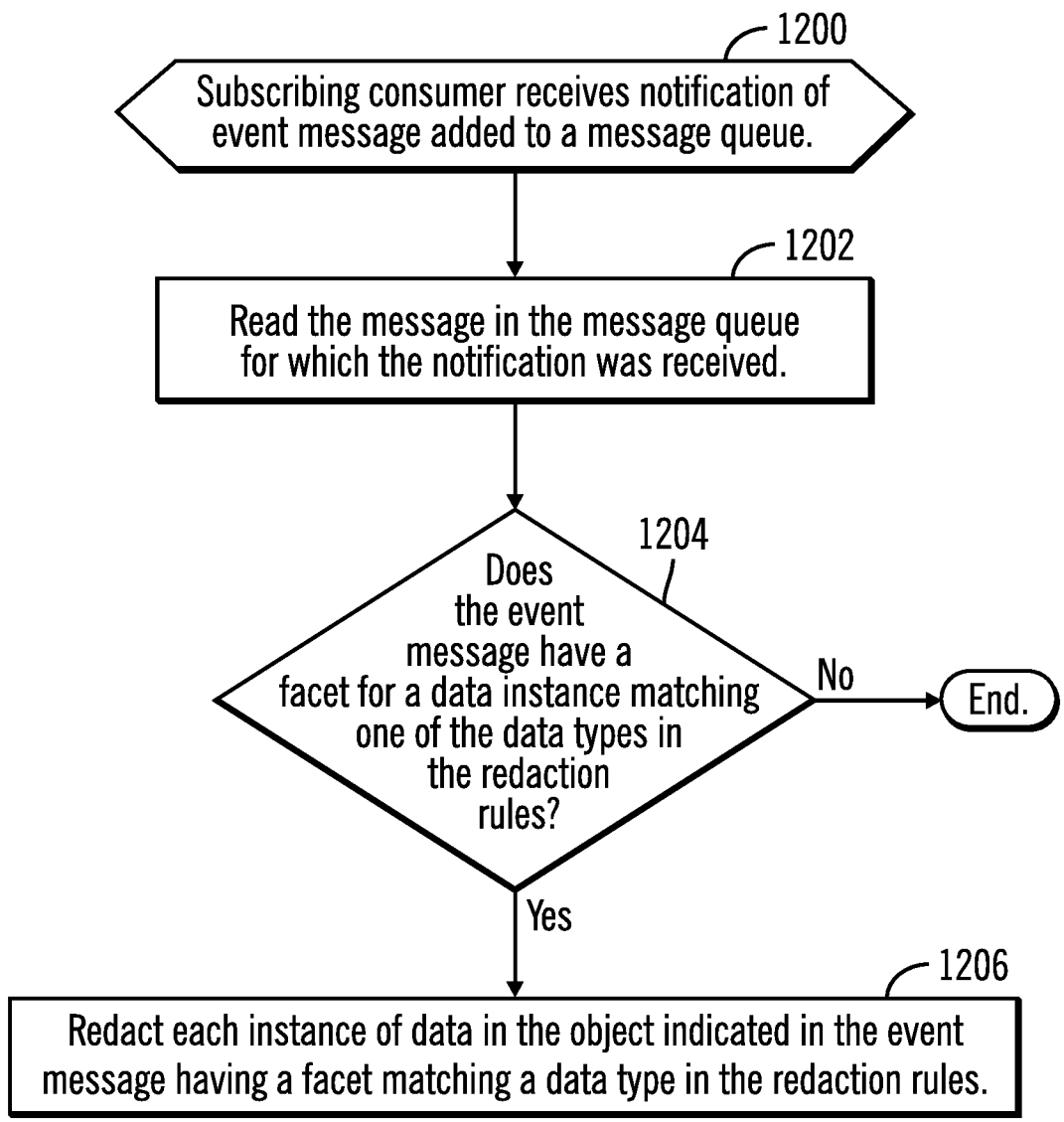
FIG. 12 illustrates an embodiment of operations to process a notification of an event message added to a message queue to determine whether to redact data in a data object indicated in the event message.

FIGS. 10, 11, and 12 illustrate an alternative embodiment where the changed data objects to subject to data redaction are determined directly from the event messages 200 in the message queues $124_1, 124_2 \ldots 124_m$ without having to query the database 300, which allows for a faster determination of the data objects to backup, such as in real time from when the data object was changed. In certain embodiments, the changed data object may be subject to redaction by processing from the message queue $124_i$ even before the changed data object in a memory of the source servers $102_1, 102_2 \ldots 102_n$ has been written to the storages $106_1, 106_2 \ldots 106_n$.

FIG. 10 illustrates an embodiment of message queue subscriber information $1000_i$ the event message dispatcher 118 maintains for each message queue $124_i$ to determine consumers $126_1, 126_2 \ldots 126_m$ that subscribe to the message queues $124_i$. The event message dispatcher 118 may maintain one instance of message queue subscriber information $1000_i$ for each message queue $124_i$. The message queue subscriber information $1000_i$ includes a message queue 1002 and a list of zero or more subscribers 1004, i.e., consumers $126_1, 126_2 \ldots 126_m$, that are to be notified when an event message 200 is added to a message queue $124_i$.

FIG. 11 illustrates an embodiment of operations performed by the event message dispatcher 118 after adding a received event message 200 to an event message queue $124_i$, such as after performing the operations of FIG. 6. After adding (at block 1100) the event message 200 to the event message queue $124_i$, the event message dispatcher 118 processes (at block 1102) the message queue subscriber information $1000_i$ for the message queue $124_i$ to which the event message 200 was added to determine a consumer 1004 subscribed to the message queue 1002. A notification is sent (at block 1104) to the determined subscribed consumers 1004 to process.

FIG. 12 illustrates an embodiment of operations performed by a consumer $126_i$ or the data redaction module 128 to process the notification sent at block 1104 of an event message $200_i$ added to the event message queue $124_i$. Upon a subscribing consumer $126_i$ receiving (at block 1200) the notification, the subscribed consumer $126_i$ may perform itself or call the data redaction module 128 to read (at block 1202) the message 200 in the message queue $124_i$ for which the notification was received. If (at block 1204) the event message 200 has a facet $400_i$ for a data instance in the object 202 matching one of the data types in the redaction rules 130, then the redaction module 128 redacts (at block 1206) each instance of data in the object 202 having a facet $400_i$ matching a data type in the redaction rules 130. If (at block 1204) there is no facet $400_i$ in the event message 200 matching a data type in the data redaction rules 130, then control ends as there is nothing new to redact for the updated object 202 indicated in the processed event message 200.

In certain embodiments, multiple consumers may receive the notification of an event message 200 added to a message queue $120_i$ to allow different consumers $126_i$ and redaction module 128 to independently determine whether to redact data instances (fields) in an updated data object.

With the embodiment of FIGS. 10, 11, and 12, real-time reporting of changes to data objects in event message are processed by consumers $126_1, 126_2 \ldots 126_m$ subscribed to the message queue $124_i$ to which the real-time event message 200 is added to allow for an immediate determination of whether the data object includes data instances to redact. In this way, there are no delays to determine whether to redact data fields in a data object after the object is updated because the object is considered for data redaction immediately upon the consumer being alerted of the change to the data object to process for redaction. Further, in certain implementations, because the event message 200 is provided immediately to the storage server 100 even before the changed data object is stored in the storage $106_i$, the determination to redact data from the data object $104_i$ may be performed before the changed data object at the source server $102_i$ is written to the storage $106_i$, such that the redacted data object may be provided to write to storage before the non-redacted version of the updated data object is written.

In the described embodiment, variables i, j, m, n, etc., when used with different elements may denote a same or different instance of that element.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computational components of FIG. 1, including the storage server 100, hosts 110, source servers $102_1$, $102_2$ . . . $102_n$, host 110, and redaction update service 132 may be implemented in one or more computer systems, such as the computer system 1302 shown in FIG. 13. Computer system/server 1302 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1302 may be practiced in distributed cloud computing environments where tasks are performed by remote processing devices that are linked through a communications network. In a distributed cloud computing environment, program modules may be located in both local and remote computer system storage media including memory storage devices.

Figure 13:
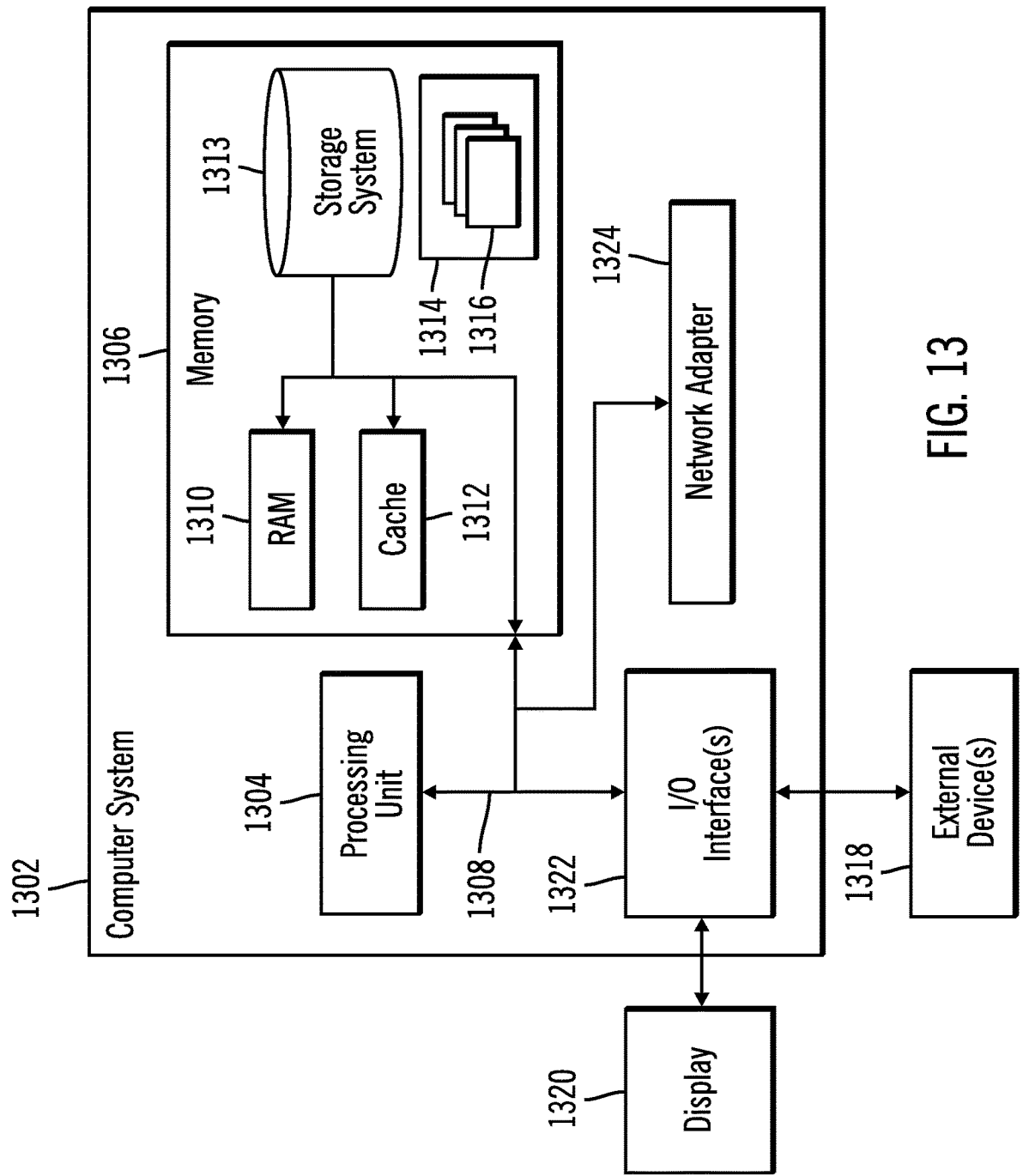
FIG. 13 illustrates a computing environment in which the components of FIG. 1 may be implemented.

As shown in FIG. 13, the computer system/server 1302 is shown in the form of a general-purpose computing device. The components of computer system/server 1302 may include, but are not limited to, one or more processors or processing units 1304, a system memory 1306, and a bus 1308 that couples various system components including system memory 1306 to processor 1304. Bus 1308 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1302 typically includes a variety of computer system readable media. Such media may be any available media that is accessible by computer system/server 1302, and it includes both volatile and non-volatile media, removable and non-removable media.

System memory 1306 can include computer system readable media in the form of volatile memory, such as random access memory (RAM) 1310 and/or cache memory 1312. Computer system/server 1302 may further include other removable/non-removable, volatile/non-volatile computer system storage media. By way of example only, storage system 1313 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1308 by one or more data media interfaces. As will be further depicted and described below, memory 1306 may include at least one program product having a set (e.g., at least one) of program modules that are configured to carry out the functions of embodiments of the invention.

Program/utility 1314, having a set (at least one) of program modules 1316, may be stored in memory 1306 by way of example, and not limitation, as well as an operating system, one or more application programs, other program modules, and program data. Each of the operating system, one or more application programs, other program modules, and program data or some combination thereof, may include an implementation of a networking environment. The components of the computer 1302 may be implemented as program modules 1316 which generally carry out the functions and/or methodologies of embodiments of the invention as described herein. The systems of FIG. 1 may be implemented in one or more computer systems 1302, where if they are implemented in multiple computer systems 1302, then the computer systems may communicate over a network.

Computer system/server 1302 may also communicate with one or more external devices 1318 such as a keyboard, a pointing device, a display 1320, etc.; one or more devices that enable a user to interact with computer system/server 1302; and/or any devices (e.g., network card, modem, etc.) that enable computer system/server 1302 to communicate with one or more other computing devices. Such communication can occur via Input/Output (I/O) interfaces 1322. Still yet, computer system/server 1302 can communicate with one or more networks such as a local area network (LAN), a general wide area network (WAN), and/or a public network (e.g., the Internet) via network adapter 1324. As depicted, network adapter 1324 communicates with the other components of computer system/server 1302 via bus 1308. It should be understood that although not shown, other hardware and/or software components could be used in conjunction with computer system/server 1302. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for determining data in an object to redact, wherein the computer program product comprises a computer readable storage medium having computer readable program code embodied therein that when executed performs operations, the operations comprising:

receiving event messages for objects from a source server managing the objects in a storage, wherein the event messages include facets for data instances in the objects from deep data inspection of the objects, wherein the facets associate data instances in the objects with redaction relevant attributes of the associated data instances that are used to determine whether the data instances for which the facets are provided should be redacted, wherein a facet indicates a redaction relevant attribute associated with a data instance in one of the objects;

adding the event messages to a message queue;

maintaining redaction rules indicating data types to redact;

determining an event message in the message queue for an object having a facet with a redaction relevant attribute matching one of the data types in the redaction rules; and redacting a data instance in the object indicated in the facet with the redaction relevant attribute matching one of the data types indicated in the redaction rules to redact.

2. The computer program product of claim 1, wherein a facet that indicates data to redact comprises at least one of sensitive data, personally identifiable information, and financial information.

3. The computer program product of claim 1, wherein the object subject to the redacting comprises a first object and the determined event message comprises a first event message, wherein the operations further comprise:

receiving an update on a new data type to redact;

determining a second event message in the message queue for a second object having a facet indicating a redaction relevant attribute matching the new data type; and redacting a data instance in the second object the facet in the second event message associates with the redaction relevant attribute matching the new data type.

4. The computer program product of claim 3, wherein the operations further comprise:

adding the new data type to the redaction rules.

5. The computer program product of claim 1, wherein an event message includes metadata on an updated object, wherein deep data inspection is performed on the updated object to update facets for the updated object that is added to the message queue.

6. The computer program product of claim 1, wherein the event messages are generated immediately after a modification resulting in an updated object to provide information on real-time changes to updated objects to the message queue.

7. The computer program product of claim 1, wherein the operations further comprise:
   receiving an update on a new data field to redact;
   determining a facet in an event message in the message queue for an object indicating data for the new data field; and
   redacting data for determined facet in the object for the new data field.

8. The computer program product of claim 1, wherein the operations further comprise:
   receiving notification of an event message added to the message queue; and
   reading the message queue to read the event message in response to receiving the notification.

9. The computer program product of claim 8, wherein the operations further comprise:
   in response to adding an event message to the message queue, determining a consumer process subscribed to the message queue to which the event message was added; and
   sending the notification to the determined consumer process to cause the determined consumer process to read the event message added to the message queue.

10. A system for determining data to redact in an object and in communication with a source server managing objects in a storage, comprising:
    a processor; and
    a computer readable storage medium having computer readable program code embodied therein that when executed by the processor performs operations, the operations comprising:
      receiving event messages for objects from the source server, wherein the event messages include facets for data instances in the objects from deep data inspection of the objects, wherein the facets associate data instances in the objects with redaction relevant attributes of the associated data instances that are used to determine whether the data instances for which the facets are provided should be redacted, wherein a facet indicates a redaction relevant attribute associated with a data instance in one of the objects;
      adding the event messages to a message queue;
      maintaining redaction rules indicating data types to redact;
      determining an event message in the message queue for an object having a facet with a redaction relevant attribute matching one of the data types in the redaction rules; and
      redacting a data instance in the object indicated in the facet with the redaction relevant attribute matching one of the data types indicated in the redaction rules to redact.

11. The system of claim 10, wherein a facet that indicates data to redact comprises at least one of sensitive data, personally identifiable information, and financial information.

12. The system of claim 10, wherein the object subject to the redacting comprises a first object and the determined event message comprises a first event message, wherein the operations further comprise:
    receiving an update on a new data type to redact;
    determining a second event message in the message queue for a second object having a facet indicating a redaction relevant attribute matching the new data type; and
    redacting a data instance in the second object the facet in the second event message associates with the redaction relevant attribute matching the new data type.

13. The system of claim 12, wherein the operations further comprise:
    adding the new data type to the redaction rules.

14. The system of claim 10, wherein the operations further comprise:
    receiving an update on a new data field to redact;
    determining a facet in an event message in the message queue for an object indicating data for the new data field; and
    redacting data for determined facet in the object for the new data field.

15. The system of claim 10, wherein the operations further comprise:
    receiving notification of an event message added to the message queue; and
    reading the message queue to read the event message in response to receiving the notification.

16. The system of claim 15, wherein the operations further comprise:
    in response to adding an event message to the message queue, determining a consumer process subscribed to the message queue to which the event message was added; and
    sending the notification to the determined consumer process to cause the determined consumer process to read the event message added to the message queue.

17. A method for determining data in an object to redact, comprising:
    receiving event messages for objects from a source server managing the objects in a storage, wherein the event messages include facets for data instances in the objects from deep data inspection of the objects, wherein the facets associate data instances in the objects with redaction relevant attributes of the associated data instances that are used to determine whether the data instances for which the facets are provided should be redacted, wherein a facet indicates a redaction relevant attribute associated with a data instance in one of the objects;
    adding the event messages to a message queue;
    maintaining redaction rules indicating data types to redact;
    determining an event message in the message queue for an object having a facet with a redaction relevant attribute matching one of the data types in the redaction rules; and
    redacting a data instance in the object indicated in the facet with the redaction relevant attribute matching one of the data types indicated in the redaction rules to redact.

18. The method of claim 17, wherein a facet that indicates data to redact comprises at least one of sensitive data, personally identifiable information, and financial information.

19. The method of claim 17, wherein the object subject to the redacting comprises a first object and the determined event message comprises a first event message, further comprising:
- receiving an update on a new data type to redact;
- determining a second event message in the message queue for a second object having a facet indicating a redaction relevant attribute matching the new data type; and
- redacting a data instance in the second object the facet in the second event message associates with the redaction relevant attribute matching the new data type.

20. The method of claim 19, further comprising:
adding the new data type to the redaction rules.

21. The method of claim 17, further comprising:
- receiving an update on a new data field to redact;
- determining a facet in an event message in the message queue for an object indicating data for the new data field; and
- redacting data for determined facet in the object for the new data field.

22. The method of claim 17, further comprising:
- receiving notification of an event message added to the message queue; and
- reading the message queue to read the event message in response to receiving the notification.

23. The method of claim 22, further comprising:
- in response to adding an event message to the message queue, determining a consumer process subscribed to the message queue to which the event message was added; and
- sending the notification to the determined consumer process to cause the determined consumer process to read the event message added to the message queue.

* * * * *